(12) United States Patent
Besta et al.

(10) Patent No.: US 12,545,199 B2
(45) Date of Patent: Feb. 10, 2026

(54) CABLE BINDER FOR VEHICLES, CABLE-BINDING ASSEMBLY, AND VEHICLE LAMP WITH THE ASSEMBLY

(71) Applicant: HELLA AUTOTECHNIK NOVA S.R.O., Mohelnice (CZ)

(72) Inventors: Petr Besta, Bouzov (CZ); Zdenek Bures, Slatinice (CZ); Tomas Galek, Namest na Hane (CZ); Matej Smolik, Ostrava Hrabuvka (CZ); Jan Suchy, Dubicko (CZ); Pavel Tinkl, Zabreh na Morave (CZ); Dusan Winkler, Mohelnice (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 0 days.

(21) Appl. No.: 18/647,153

(22) Filed: Apr. 26, 2024

(65) Prior Publication Data
US 2024/0359644 A1     Oct. 31, 2024

(30) Foreign Application Priority Data

Apr. 28, 2023    (EP) .................................. 23170724

(51) Int. Cl.
*B60R 16/02* (2006.01)
(52) U.S. Cl.
CPC ................... *B60R 16/0215* (2013.01)
(58) Field of Classification Search
CPC .... B60Q 1/0094; H02G 3/32; B60R 16/0215; B65D 63/1027; B65D 63/1063; B65D 2563/103; B65D 2563/108
USPC .......................... 248/71; 24/16 PB; 174/72 A
See application file for complete search history.

(56) References Cited

U.S. PATENT DOCUMENTS

| | | | | |
|---|---|---|---|---|
| 3,550,219 | A * | 12/1970 | Van Buren, Jr. | F16L 3/233 248/74.5 |
| 4,705,442 | A * | 11/1987 | Fucci | F16B 21/08 24/453 |
| 5,752,681 | A * | 5/1998 | Janssen | F16L 3/22 248/65 |
| 5,921,510 | A | 7/1999 | Benoit et al. | |
| 8,028,962 | B2 | 10/2011 | Geiger | |
| 8,918,964 | B2 * | 12/2014 | Iwahara | H02G 3/32 24/17 AP |
| 8,950,713 | B2 * | 2/2015 | Ogasawara | F16L 3/137 248/74.1 |

(Continued)

FOREIGN PATENT DOCUMENTS

CN    110145642 A    8/2019

*Primary Examiner* — Anita M King
(74) *Attorney, Agent, or Firm* — WARNER NORCROSS + JUDD LLP (57) ABSTRACT

Cable binder for vehicles, cable-binding assembly comprising the binder, and vehicle lamp with the assembly. The binder comprises a body for attachment to the vehicle and a strip for binding cables which is fixed to the body. The strip can be closed into a loop for binding the cables using a securing mechanism. The body comprises a mounting protrusion for insertion into an opening in a vehicle. The mounting protrusion comprises a poka-yoke element for engaging with a complementary poka-yoke element in the vehicle's opening and comprises at least one fin for bracing against a wall surrounding the vehicle's opening. Each fin extends around at least part of perimeter of the mounting protrusion.

15 Claims, 8 Drawing Sheets

(56) References Cited

U.S. PATENT DOCUMENTS

| | | |
|---|---|---|
| 10,480,688 B2 | 11/2019 | Tschida et al. |
| 11,581,720 B2 * | 2/2023 | Daude .................... F16B 5/0685 |
| 2005/0242247 A1 * | 11/2005 | Geiger .................. F16L 3/2332 |
| | | 248/71 |
| 2006/0130286 A1 | 6/2006 | Igarashi et al. |
| 2006/0239796 A1 * | 10/2006 | Franks .................. F16L 3/2336 |
| | | 411/455 |
| 2007/0284486 A1 * | 12/2007 | Smutny .................... H02G 3/30 |
| | | 248/74.3 |
| 2016/0047494 A1 * | 2/2016 | Dickinson ............. F16G 11/143 |
| | | 248/74.1 |
| 2016/0223100 A1 | 8/2016 | Geiger |
| 2019/0331258 A1 | 10/2019 | Geiger et al. |

\* cited by examiner

CABLE BINDER FOR VEHICLES, CABLE-BINDING ASSEMBLY, AND VEHICLE LAMP WITH THE ASSEMBLY

CROSS-REFERENCE TO RELATED APPLICATIONS

The present application claims the benefit of European Patent Application No. 23170724.1, filed Apr. 28, 2023, the disclosure of which is incorporated by reference.

FIELD OF THE INVENTION

The present invention relates to cable binders for fixing cables connecting electrical components inside of vehicles. It especially relates to cable binders for use in vehicle lamps, such as headlamps or taillamps.

BACKGROUND OF THE INVENTION

In the state of the art, cable binders are used in automotive industry for securing bundles of cables, e.g., for powering headlight components or infotainment devices. The binders keep the cables at a desired position and keep them still during travel, which helps preventing damage of the cables by scraping or chafing them against their surroundings. Unsecured cables could be damaged as they repeatedly and over a long time move or vibrate while in contact with e.g., an edge of an adjacent vehicle component. This can lead to a necessity for replacing the cables or even a whole component, such as a headlight, once the cables become too damaged for a safe operation.

Standard cable binders known in the art use a zip tie bands for holding the cables tightly together. The zip tie can then be fixed to the vehicle by any means, e.g., by gluing, welding or by the zip tie itself or another zip tie. In automobile lamps, a known way of fixing the zip tie binders inside of the lamp is to provide them with a body, usually made from one piece of material with the zip tie. The body has a cylindrical opening, and the lamp casing is provided with a cylindrical metallic pin onto which the opening can be mounted.

A shortcoming of this solution is that the binder is not fixed to the pin securely enough, it can move on the pin, often even rotate around it. The plastic body can thus be scraped by the metal pin and can become more and more loose on the pin. The bound cables can still move around to some extent and can thus also be damaged. Another shortcoming is that the binder can be mounted onto the pin in many orientations. The cables can thus by fixed in a different place or leading in a different direction than what was intended by design engineers. This can again lead to more damage to the cables.

It would therefore be desirable to come up with an improved cable binder solution which would remove or limit at least some of the problems of the known binders.

SUMMARY OF THE INVENTION

The shortcomings of the solutions known in the prior art are to some extent eliminated by cable binder for vehicles, the binder comprising a body for attachment to the vehicle and a strip for binding cables. The strip is fixed to the body, e.g., the binder can be from a single piece of material. The binder further comprises a securing mechanism for closing a part of the binder into a loop around the cables which are intended to be bound. The body comprises a mounting protrusion for insertion into an opening in a vehicle, wherein the mounting protrusion comprises a poka-yoke element for engaging with a complementary poka-yoke element in the vehicle's opening. The mounting protrusion can also be from one piece of material with the body. It can for example have substantially cylindrical or conical shape, for example with diameter from 5-20 mm and length from 15-40 mm. Different shapes are however also possible, e.g., a square shape or non-regular shape. The fins can be made such that the opening can be smaller than the mounting protrusion when viewed in the insertion direction such that the fins are elastically deformed during the insertion.

The poka-yoke element of the mounting protrusion comprises a poka-yoke protrusion and/or a recess. The opening for mounting of the binder thus contains complementary poka-yoke recess and/or poka-yoke protrusion for cooperating with the element of the binder in order to prevent at least some incorrect mounting orientations, e.g., to prevent rotation around the mounting protrusion's axis. The mounting protrusion further comprises at least one fin for bracing against a wall surrounding the vehicle's opening, wherein each fin extends around at least part of perimeter of the mounting protrusion.

The wall can be an inner wall of the opening, e.g., a substantially cylindrical surface of a round through hole. It can also, alternatively or additionally, be the wall in which an entrance/exit to/from the opening is located. For example, if the opening is a round through hole, the fin(s) can be braced against both surfaces of the wall through which the opening passes. In other words, the bracing by the fins can exert a force to the wall, and this force can be substantially parallel with the direction of insertion of the mounting protrusion into the opening and/or it can be substantially perpendicular to the direction.

The fin/each of the fins/some of the fins can surround only a part of the mounting protrusion's perimeter, e.g., it can extend around the mounting protrusion, perpendicularly to its length and the mounting/insertion direction, on only a part of its circumference. Preferably, however, there is at least a part of each fin such that a different part of the fin or of a different fin is located on the opposite side of the mounting protrusion. The forces from the fins are then at least partially balanced which helps keeping the binder steady. It is also possible to provide the fins on the whole perimeter of the mounting protrusion. The fin(s) can be arranged such that they are symmetrical with respect to at least one plane parallel to the mounting protrusion's length. It might also be advantageous if each fin is formed from two parts, located on opposite sides of the mounting protrusion, at the same distance from the mounting protrusion's free end. This division into two parts enables the fins to be bent or folded relatively easily during insertion, while being larger that the opening's cross section in undeformed state.

The strip can be made of plastic and its thickness can be chosen such that it is flexible enough to be closable into the loop while being strong enough to hold the cables secured over a long time, e.g., many years during a whole lifetime of a headlight. In can however be also made e.g., from metal, leather etc. The body can for example be a block of material provided with the mounting protrusion for attaching it to the vehicle, e.g., to an automobile lamp's casing. When the loop is closed and tightened, the length of the strip which is a part of the loop might depend on the number of cables and their shape and diameter. The exact shape and size of the loop can depend on materials used, on properties of the cables, on features of the securing mechanism etc. The loop can be entirely formed by the strip, or it can be partially formed by the body.

Poke-yoke basically means that the element, or more precisely the two cooperating elements (one on the mounting protrusion, one in the opening), can ensure mounting of the binder to the vehicle in one or more predetermined correct positions while incorrect positions are prevented. For example, only a single orientation of the binder with respect to the vehicle can be correct, and the mounting of the binder is then preferably possible in only this one orientation. The bound cables are then guided in position and orientation intended by the designer, regardless of skill, experience or attention of the workers providing the mounting. The poka-yoke elements can especially be two interlocking elements, such as a poka-yoke protrusion and a complementarily shaped recess, which can engage with each other when oriented correctly, and which make mounting less possible (e.g., requiring a suspicious or unnatural amount of destructive strength by an assembly line worker) when oriented incorrectly. The mounting protrusion can thus by asymmetrical, i.e., does not have a rotational shape. For example, it can be a cylinder or a cone with a single poka-yoke protrusion or recess providing for the asymmetry+with the fins, which can but do not have to be symmetrical. Rotation of the body around the opening is thus prevented by the element together with the incorrect mounting, which also helps stability of the cables and makes sure they stay in position intended by the designer.

The advantage of the present invention is thus in that it simplifies mounting of the binder to the automobile by blocking at least some incorrect positions. The cables can then be more reliably guided in the automobile in places intended by designers of the respective vehicle part, e.g., of a lamp, and they have less tendency to move over time. Damage done to the binder or opening by them scraping against each other can also be reduced by the invention since they can move with respect to each other less than with the use of solutions known from the state of the art. The binder can also be mounted into vehicles which were not adapted for binder-mounting during their manufacture. E.g., a simple hole can be drilled in a vehicle component, provided with a poka-yoke recess and the binder can be mounted therein.

The cable binder can be provided such that the mounting protrusion on the body can be mountable into the opening of the vehicle in only one orientation of the body with respect to the opening. This can especially be ensured by the poka-yoke elements. The elements can be shaped such that the mounting protrusion is insertable into the opening only if the poka-yoke recess (on the mounting protrusion or on the opening's wall) is aligned with the poka-yoke protrusion (on the opening's wall or on the mounting protrusion), wherein there is only one position when this alignment and subsequent insertion is possible.

The securing mechanism can be a zip tie mechanism. This mechanism, also called cable tie, can be made unopenable, i.e., requiring destruction (e.g., snipping of the stripe) if the cables need to be unbound. It can also be made openable such that the loop can be opened and then closed again. Other securing mechanisms, such as utilizing Velcro or magnetic connections, can also be used.

The cable binder can be made of a plastic material containing a glass filler. PA66 with glass fibers can be used, as an example of a suitable material. A different filler, e.g., carbon fibers, is also possible.

The mounting protrusion can comprise at least two fins in total, wherein the fins extend parallelly to each other. The fins are thus arranged in a row, which extends in the direction of the mounting protrusion's length. When multiple fins are provided, one of them or more of them can keep the binder in the opening at given time, depending on their arrangement, shape and size and also on features of the opening.

The mounting protrusion has a fixed end, which is attached to the body, and a free end for insertion into the opening. Each fin can then be tapered in direction towards the free end. This shape facilities the insertion of the mounting protrusion into the opening and can prevent its removal. It might be even impossible to pull the mounting protrusion back from the opening without destroying it, e.g., breaking some of the fins. The fins can flexible, such that they elastically deform during insertion. The tapering can then be done by tilting each fin in the direction towards the fixed end. The thickness of the fin can then be substantially constant and can ensure the flexibility. The elastic force from the deformation can then hold the binder in the opening.

When viewed in direction parallel to the length of the mounting protrusion, an outer perimeter of each fin can form at least a part of a circle. Circular shape of the fin(s) can be advantageous because it can spread load to the fin substantially uniformly. There are thus no corners etc., which might be susceptible to breaking off during insertion. The fin can then be for example at least partially conical.

The strip can comprise at least one groove for fitting at least part of a perimeter of a cable, wherein the groove extends across the whole width of the strip and is placed on the side of the strip meant for contacting the cables. It is also possible to place the groove more generally on the section of the binder which can be closed into the loop around the cables which are to be bound. The section comprises at least a part of the strip, it can also comprise a part of the body, e.g., the body's wall to which the strip is attached.

For example, the groove can have a round shape, with a cross section substantially in the shape of a half circle, such that it can fit (a half of) a round cable. The groove extends across the width of the section and is placed on the inner side of the loop when the section is closed into the loop. The groove can therefore come into contact with at least some of the bound cables and can guide the cables. The width of the section can be the width of the strip, of the wall of the body forming part of the loop etc. It is possible to provide at least one groove on the body and at least one groove on the strip. These grooves can then be on different sides of the inner side of the loop when closed, e.g., even opposite to each other, and the cables can thus by guided by the grooves on multiple sides of the cable bundle.

The section, which closes into the loop, can comprise at least two parallel ridges protruding from the strip and/or the body, wherein the groove is between two adjacent ridges. These ridges thus extend in the direction of the width of the strip, along the desired direction of cables in the loop. The ridges preferably have blunt edges to prevent cable damage. A groove can also be partially formed next to a ridge, e.g., when the strip is bent such that it forms the other side of the groove when the loop is closed. If more than two ridges are provided, more than one groove can be formed between them.

Cables bound by the loop run through the loop substantially in the direction of the width, and the grooves help keeping them straight, parallel to each other. As a result, the cables can be held more securely, and the loop is less likely to become loose during use. Such a loosening could e.g., occur if the cables were bound twisted with each other, so they would not run through the loop perpendicularly to the loop's cross section. Long term vibration due to the vehicle's operation can then shake the cables such that they become more aligned with each other, and the bundle of cables thus takes up less space. The loop is then too loose for the cables, doesn't hold them tightly enough, and the cables can move around more freely, can became damaged by scraping against their surroundings, can make noise etc. Providing the loop with the grooves in the present invention helps preventing this situation—the cables are tightened in a more orderly and more mutually aligned fashion, the bundle of cables is more secured, and the negative effects of loose cables are limited.

The body can comprise two ribs for squeezing cables, wherein the ribs are inside of the loop when the binder is closed into a loop around the cables and both ribs extend along the inner perimeter of the loop perpendicularly to the direction of cables bound by the loop. If the groove as described above is a part of the binder, the ribs are thus perpendicular to the groove.

In general, at least one rib can be placed on a section of the binder which forms the loop, which can especially be a part of the strip and a part (e.g., one wall to which the strip is connected) of the body. In other words, the rib can also be on the strip. The rib is then inside of the loop so it can contact the cables. The rib can for example by raised with respect to its surroundings by 0.1-3 mm, e.g., 0.2-2 mm, depending, among other factors, on number of cables, their diameter, material of their sheaths etc. The rib(s) can locally increase pressure on the cables by the loop, which can help securing the cables in place and prevent their shifting through the loop/shifting the loop along the cables.

Using two parallel ribs, as described above, can however be more advantageous. The cables can then be squeezed at two places, with a less tight portion in between, which limits movement of the cables in either direction through the loop.

The at least one rib can be on the body. For example, the body can contain the rib(s) while the strip contains the grooves. The at least one rib can be inside of the loop when the binder is closed into a loop around the cables. The rib(s) can then extend along the inner perimeter of the loop perpendicularly to the direction of cables bound by the loop.

The use of the fins, together with the poka-yoke elements, keeps the binder in a desired position, as described above. Combining these features with the at least one groove, whether placed on the strip and/or on the body, then keeps the cables steady inside of the loop, especially when also combined with the at least one rib (either on the strip and/or on the body). These combined features thus provide significant increase in the stability of cables in the vehicle.

The strip optionally comprises an anti-slip structure placed on the side of the strip for contacting the cables. A protruding or recessed pattern can for example be used on the strip. The pattern is preferably chosen such that it does not scrape or otherwise damage the cables while it keeps them from moving in the loop.

The shortcomings of the solutions known in the state of the art are also to some extent eliminated by a cable-binding assembly for vehicles comprising a component for a vehicle, wherein the component comprises an opening. The assembly further comprises the cable binder according to the invention, wherein the opening comprises a poka-yoke element for engaging with the poka-yoke element of the binder when the body of the binder is mounted by the mounting protrusion into the opening.

The opening can be a cavity formed in a protruding part (e.g., shaped as a pin or peg) of the component, wherein when the mounting protrusion is inside of the opening, at least one fin presses against an inner wall of the cavity. The friction by the fin then helps keeping the binder in the opening. Using such a protruding part can simplify mounting of the binder. For a thick enough component, the cavity can also be created in a non-protruding part. The protruding part can be divided along its length by a slit into multiple sections which can then be elastically deformable during insertion. The mounting protrusion can then be clamped by the section, as well as attached in the cavity by the elastic force of the fin(s).

The opening can also be a through hole in a wall of the component. This can be advantageous when there is not enough space for the protruding part or when it would be inconvenient to produce the component with the protruding part, e.g., when it is made from a sheet of metal.

The binder can then comprise a stop element for delimiting a maximum insertion of the mounting protrusion into the opening, wherein the shortest distance between at least one of the fins and the stop element is smaller than thickness of the wall. The at least one fin is then located inside of the opening after insertion of the mounting protrusion. The fin can thus be braced against the inner wall(s) of the opening. Alternatively or additionally, when the mounting protrusion is inside of the opening, the wall is clamped between at least one of the fins and the stop element. This one fin is then different then the one inside of the opening, if these two possibilities are combined. The clamping can be improved by making the respective fin and/or the stop element flexible such that they exert force to the wall caused by their elastic deformation during mounting.

The shortcomings of the solutions known in the state of the art are also to some extent eliminated by a vehicle lamp, e.g., an automobile lamp, which comprises the assembly.

The strip of the cable binder according to the invention can be attached to the body via a connection portion, which is a part of the body. The portion can comprise two branches, with a space in between, which are both connected to the body on one side and to the strip on their other side. Using such a connecting portion can provide the strip-body connection with some flexibility so the strip is much less likely to be broken off and the connecting portion can be bent to some extent when the loop is closed, which helps with tightly securing the cables. Thanks to the branching, the flexibility can be provided while the portion is wide enough to hold the cables along a larger portion of their length, which helps preventing breaking/sharply bending the cables at the binder. The connecting portion can alternatively or additionally be curved such that the loop, when closed, is formed next to the body. A wall of the body can then be a part of the loop and the bundle of cables can be guided close to the surface to which the body is attached.

BRIEF DESCRIPTION OF THE DRAWINGS

The invention is further described by means of exemplary embodiments thereof, which are described with reference to the accompanying drawings, in which.

DETAILED DESCRIPTION OF THE CURRENT EMBODIMENT

The invention will be further described by means of exemplary embodiments with reference to the respective drawings.

Figure 11:
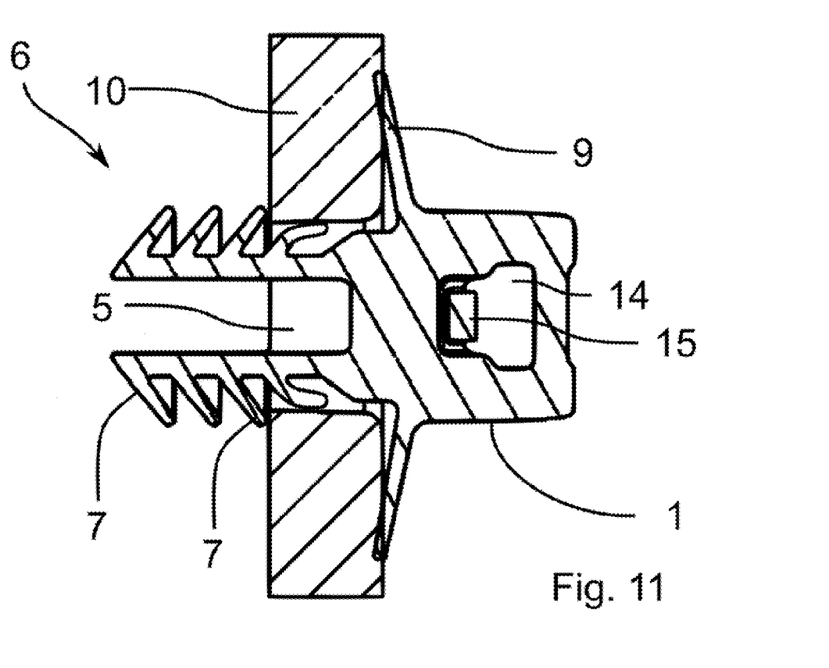
FIG. 11 schematically shows a sectional view of an alternative mounting, wherein the thickness of the wall is such that one of the fins is braced against the inner wall of the opening while another fin is in contact with the opening's surroundings.
Figure 12:
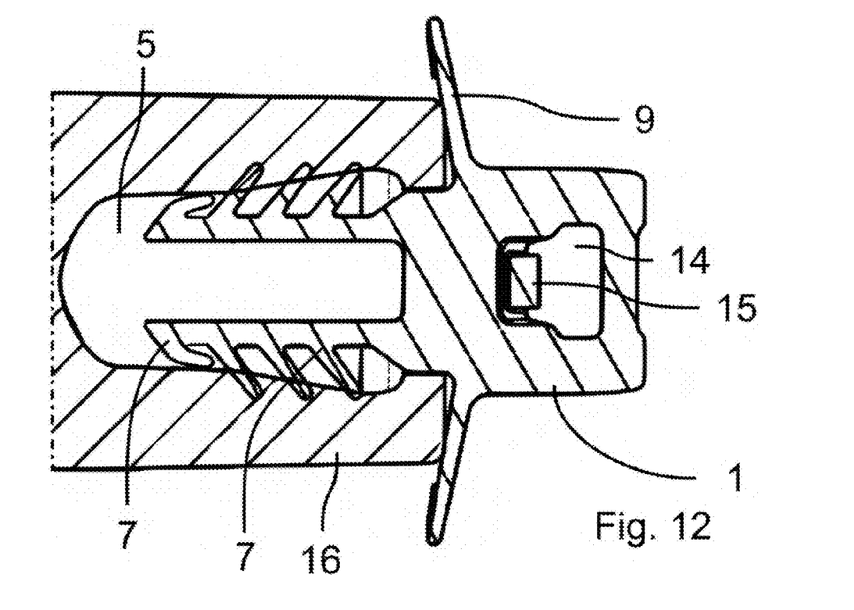
FIG. 12 schematically shows a sectional view of an alternative mounting of the binder where the opening is the cavity from FIG. 7.
Figure 13:
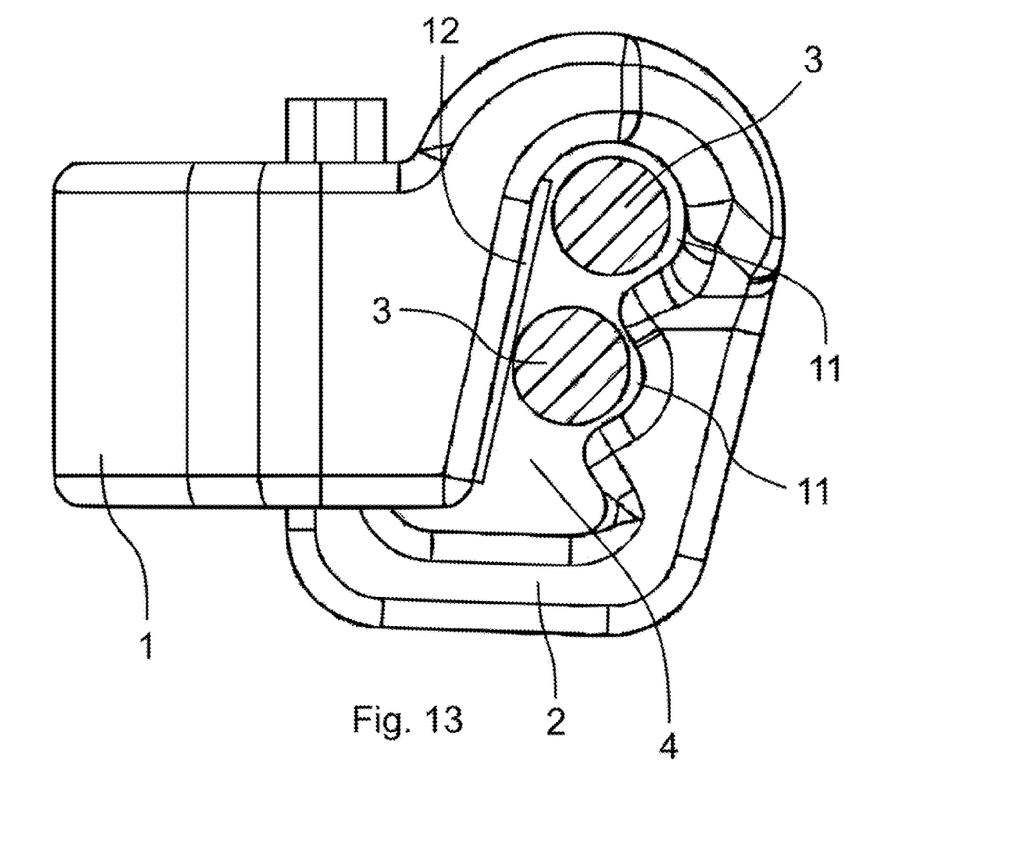
FIG. 13 schematically shows a sideview of a loop created by the binder around two cables.

An exemplary embodiment of the cable binder according to the invention is depicted in FIGS. 1 to 5, and several embodiments of attachment of the binder to a vehicle component are depicted in FIGS. 6 to 12. FIG. 13 then shows a detail of the binder in use, with two cables 3 squeezed by a rib and guided by grooves 11; the binder in this figure is simplified, the details shown can however be a part of the embodiment from FIGS. 1-5.

The cable binder comprises a body 1 and a flexible strip 2, preferably made from one piece of material, e.g., plastic with addition of glass filler, such as glass fiber. A different filler, e.g., carbon fibers, can also be used. The body 1 serves for fixing the binder to an opening 5 provided in a vehicle, and the strip 2 serves for holding the cables 3, which are to be bound by the binder, tightly together and fixes them to the body 1 and therefore to the vehicle.

In order to secure the cables 3, the binder comprises a securing mechanism that can be used to make a loop 4 from the strip 2 around the cables 3 and to hold the loop 4 closed. Part of the loop 4 can also be formed from the body 1 (see FIG. 13). In the depicted embodiments, the mechanism is a zip tie mechanism. That is, the body 1 comprises a through hole 14 for the strip 2, the strip 2 comprises a ratchet-a line of teeth (see e.g., FIG. 1 or 6), and the through hole 14 comprises a pawl 15 for engaging with the ratchet. The free end of the strip 2 can thus by pushed through the through hole 14, with the pawl 15 and teeth being shaped such that they do not prevent movement in this one direction, but it cannot be pulled back—the pawl 15 prevents that by engaging the teeth. Therefore, once the cables 3 are placed next to the body 1 on the strip 2 and the loop 4 is created around them, it can only be tightened, it cannot generally be loosened or opened without destroying the strip 2. It is however also possible to provide a releasable zip tie securing mechanism where the pawl 15 can be disengaged from the ratchet.

A different kind of closure, which can be both a kind that cannot be opened without destruction or a kind that can be opened and closed repeatedly, can also be used. For example, a hook-and-loop fastener, magnetic fastener, buckle-type fastener, a row of snap fasteners on the strip 2 with at least one complementary snap fastener one the body 1, the other side of the strip 2 etc., a fastener with an adhesive, or other type of fastener can be used.

Figure 10:
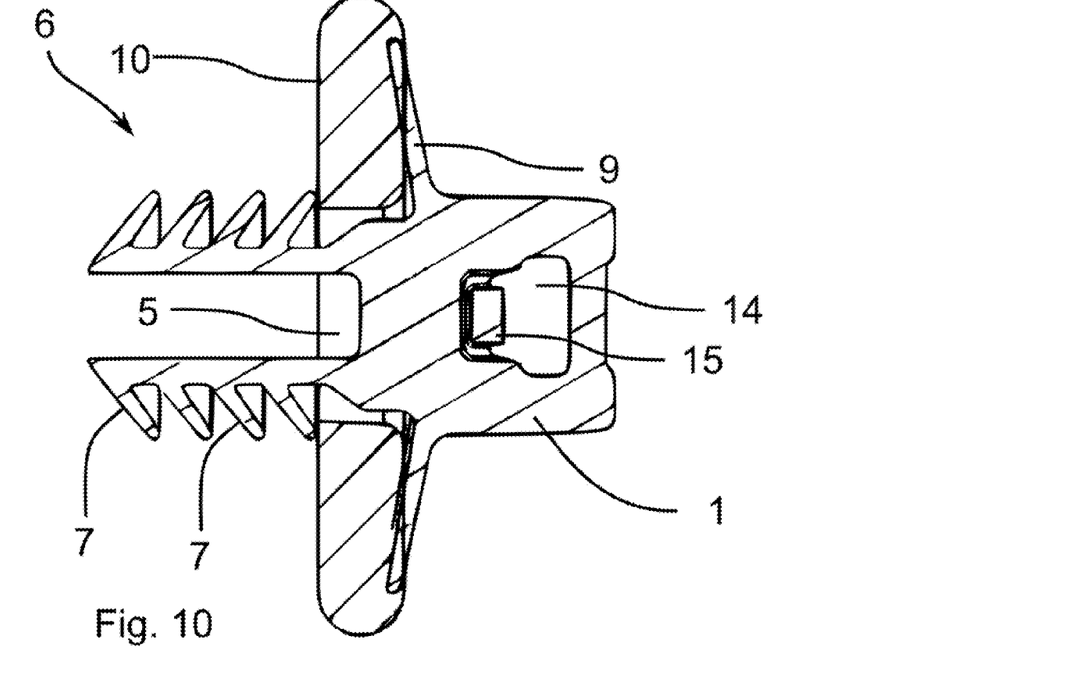
FIG. 10 shows a sectional view of an exemplary mounting of the binder from FIG. 1 into a through hole opening, wherein the thickness of the wall containing the opening is such that the wall is clamped between the stop element and one of the fins.

Fixing or mounting of the body 1 to the opening 5 is accomplished by a mounting protrusion 6 attached to the body 1, preferably made from a single piece of material with the body 1. This mounting protrusion can be inserted into the opening 5 and comprises a row of fins 7 for keeping it in the opening 5. At least one fin 7 is braced against the opening's 5 surroundings (e.g., its inner wall or a wall 10 of the component around entrance to the opening 5) when the mounting protrusion is inserted and prevents the mounting protrusion from being easily pulled from the opening 5. In the embodiment in the figures, there is a row of four fins 7 parallelly and equidistantly arranged along the mounting protrusion. Each fin 7 is partially conical (see FIGS. 4 and 5) such that it is narrower closer to the free end of the mounting protrusion than to the fixed end (i.e., fixed to the body 1) of the mounting protrusion. This tapering/narrowing facilitates the insertion and prevents pulling the mounting protrusion from the opening 5. Each fin 7 is divided into two parts by a poka-yoke element 8 (described in more detail below) and by a cavity inside of the mounting protrusion (see FIG. 5). The cavity simplifies manufacture of the binder, other embodiments can however be made without it. The fins 7 are not connected directly to the poka-yoke element 8 in order to make them more flexible. Providing flexibility is further ensured by the thickness of each fin 7—as can be seen in FIG. 10, each fin 7 has a conical front surface and also conical back surface, such that the thickness is substantially constant. Each fin 7 can thus be bent towards the main part of the mounting protrusion 6, so it's possible to insert the mounting protrusion while the fins 7 have larger cross section (when viewed in the insertion direction) that the opening 5.

In alternative embodiments, there can be a different number of fins 7. The shape of the fins 7 can be also different, e.g., they can have elliptical, polygonal or non-regular shape when viewed from the front (in the inserting direction). The fins 7 can in some embodiments each have a different shape. The poka-yoke element 8 can in some embodiments have a shorter length then in the depicted embodiment, e.g., can only be on the front half of the mounting protrusion. The fins 7 can then be in the part of the mounting protrusion without the poka-yoke element 8.

Figures 5, 6:
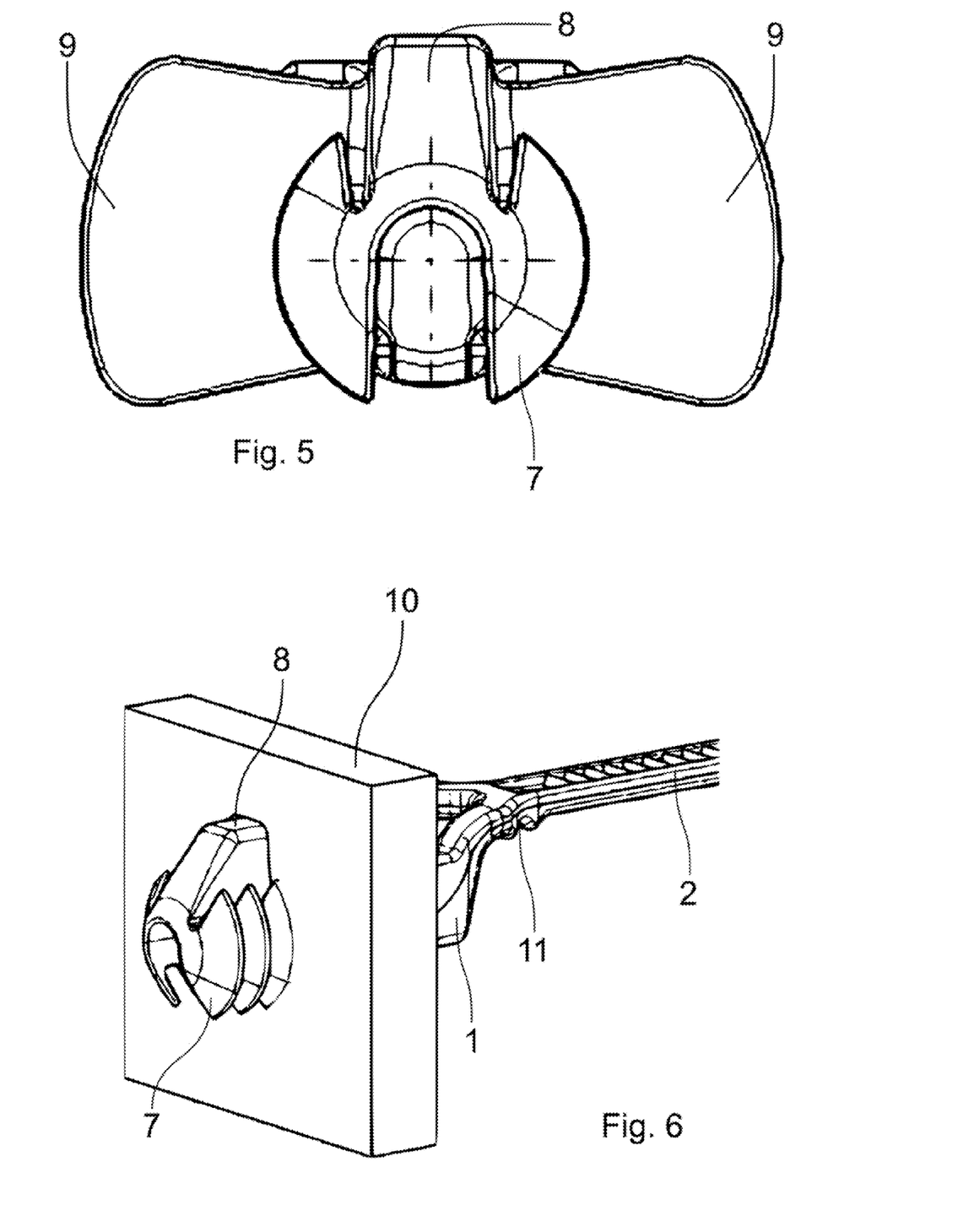
FIG. 5 schematically shows a front view of the binder from FIG. 1.
FIG. 6 schematically shows a perspective view of the binder from FIGS. 1 to 5 mounted into an opening in a wall of a vehicle component.
Figure 9:
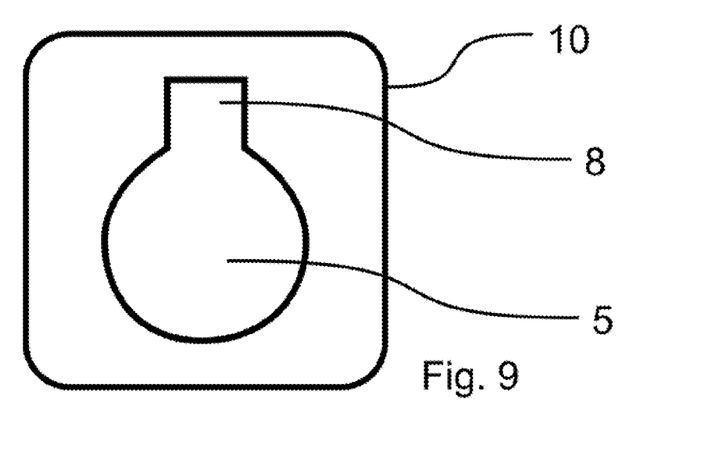
FIG. 9 schematically shows an alternative embodiment of the opening, where the opening is a through hole in a wall of a vehicle component.

On the mounting protrusion 6, there is a poka-yoke element 8 for cooperating with a complementary poka-yoke element 8 in the opening 5 (see e.g., FIGS. 6 and 9). The elements make sure that the binder can be mounted into the opening 5 in correct orientations only, e.g., to ensure that the bound cables 3 extend in expected directions and are thus not bent inadequately, forced against a surface which might damage their sheaths etc. These elements only allow the mounting protrusion to be inserted into the opening 5 in a single orientation. Mounting in other orientation is preferably impossible or possible only with exertion of a large amount of force by the person doing the mounting such that an accidental incorrect mounting is made very unlikely. In the depicted embodiment, the poka-yoke element 8 of the body 1 is a poka-yoke protrusion on the mounting protrusion 6 extending along the mounting protrusion's length. The opening 5 then has a recessed part which enables insertion of the poka-yoke protrusion. Since only one poka-yoke protrusion and recess is provided, the mounting protrusion 6 and the opening 5 are not symmetrical around any rotational axis, i.e., they are not shaped simply as solids of revolution such as cylinders or cones, and mounting them together rotated around their axes is also prevented, unless it is a rotation by a number of full turns.

Any other shape, orientation, arrangement etc. of the poka-yoke elements 8 can be used in alternative embodiments. Any such elements which ensure the poka-yoke principle for mounting of the binder into the opening 5 can be used. For example, the mounting protrusion can comprise a poka-yoke recess and the opening 5 can comprise a poka-yoke protrusion which are arranged for locking together in the correct orientation and for preventing mounting in other orientations. It is also possible to provide multiple poka-yoke elements 8 on the mounting protrusion 6 and/or in the opening 5, as long as they ensure the correct mounting. If the application of the binder allows for multiple correct orientations, the poka-yoke elements 8 can be adapted for allowing these multiple orientations and preventing other orientations.

The body 1 further comprises a stop element 9, which delimits a maximum insertion of the mounting protrusion into the opening 5. It the depicted embodiments, the stop element 9 is a flexible flap which has two parts on the opposite lateral sides of the body 1 and which can contact the opening's 5 surroundings with a substantial area and can be elastically deformed when the mounting protrusion is inserted. In the depicted embodiment, the flap has a surface area at least three times as large as the fins 7, when viewed from the front. Alternatively, however, the stop element 9 can be realized differently as any widened portion of the body 1 which cannot be inserted into the opening 5, at least not without requiring substantial amount of force, not likely to occur during standard assembly operations. For example, a flange on the whole perimeter of the body 1 could be used. The stop element 9 can also be a part of the mounting protrusion, instead of the body 1 itself.

Figure 7:
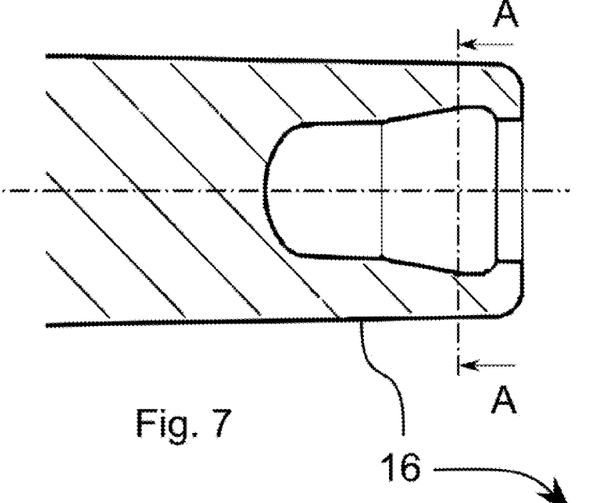
FIG. 7 schematically shows a cross section view of an embodiment of an opening in a vehicle component, where the opening is a cavity in a protruding part of the component.
Figure 8:
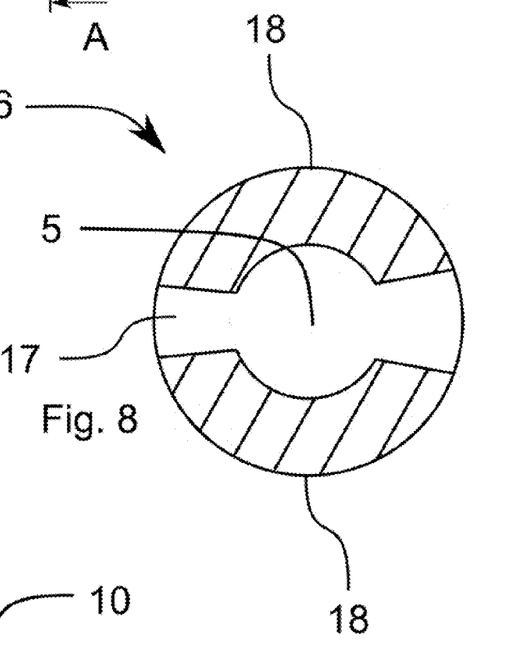
FIG. 8 schematically shows a cross section A-A of the protruding part from FIG. 7.

The opening 5 for mounting of the mounting protrusion can be realized in two main ways—as a through hole in a wall 10 of a vehicle component, e.g., a wall 10 from 2 to 5 mm thick (see FIG. 9) or as a cavity, especially in a protruding part 16 of the vehicle component (see FIG. 7). The binder as described above can be used for both these main ways. When the opening 5 is a through hole, the thickness of the wall 10 with the opening 5 and/or the distance between the stop element 9 and the fins 7 determines one of two possibilities: First possibility is that at least one of the fins 7 is inside of the opening 5 after full insertion of the mounting protrusion 6 (FIG. 11). More than one fin 7 can be inside. This at least one fin 7 is thus braced against the opening's 5 walls and holds the binder secure by its prestressing force (from elastically bending the fin 7 during insertion) and resulting friction between the fin 7 and the wall(s).

The second possibility is that the wall 10 is not significantly thicker than the distance from the stop element 9 to the closest fin 7. It can be slightly thicker since the fin 7 and/or the stop element 9 can be flexible. The wall 10 is thus placed between the stop element 9 and the fins 7 after the insertion. Preferably, the wall 10 is clamped between the closest fin 7 and the stop element 9 (see FIG. 10). Both the fin 7 and the stop element 9 can be flexible such that they are prestressed during the insertion, and they exert a force on the wall 10, thus keeping the binder steady. In FIG. 10, the drawing is simplified such that the stop element 9 is not illustrated as elastically deformed, and it passes through the wall 10. In reality, the stop element 9 would contact the wall 10, without merging with it or passing through. The second possibility can be combined with the first one, i.e., at least one fin 7 can be inside of the opening 5 while some subsequent fin 7 is outside, braced against the area around the opening's 5 entrance. The binder is thus fixed by the clamping force as well as be the bracing force towards the opening's 5 inside walls by the elastically deformed fin 7 inside of the opening 5. Significant advantage of the intention can be that the same binder can be mounted in any of the three ways and possibilities described above, depending on how the opening 5 is created. The same binder can thus be used in many different applications and on many different components. The opening 5 can even be provided by drilling through a wall 10 of a component specifically made for mounting of a cable binder.

When the opening 5 is a cavity, at least one fin 7 is braced against the cavity's inner wall after the insertion. Preferably, multiple fins 7 are braced this way. FIG. 12 depicts this embodiment. Only one fin 7 is shown elastically deformed in this simplified figure, however in reality the other fins 7 would also be in contact with the wall's surface, without merging with it or passing through. The entrance into the cavity is preferably narrower that a middle portion of the cavity in order to prevent backwards movement of the mounting protrusion 6. The cavity can be created inside of a protruding part 16 of the vehicle component. E.g., a cylindrical or conical protruding part 16 can be provided, with the cavity placed coaxially inside. The protruding part 16 is then preferably split into multiple sections along its length. Two sections 18 of protruding part 16 are provided in the embodiment shown in FIG. 8—each of the hatched areas in this figure is one section. The sections 18 of protruding part are separated from each other by a slit 17 along preferably most of the cavity's length. The sections can thus be at least slightly elastically deformed during the inserting. The mounting protrusion is thus held in the cavity not only be the elastic force from the fins 7 but also by an elastic force from the sections. The slit 17 can also serve as a poka-yoke element 8. In the depicted embodiment, the slit 17 is narrower at one of its ends and broader at the other end (on the right side in FIG. 8, on the upper side in the perspective view in FIG. 14) such that the poka-yoke element 8 with poka-yoke protrusion of the mounting protrusion 6 can only fit into the broader end. A single correct orientation in which the insertion is possible is thus ensured.

Figures 14, 16:
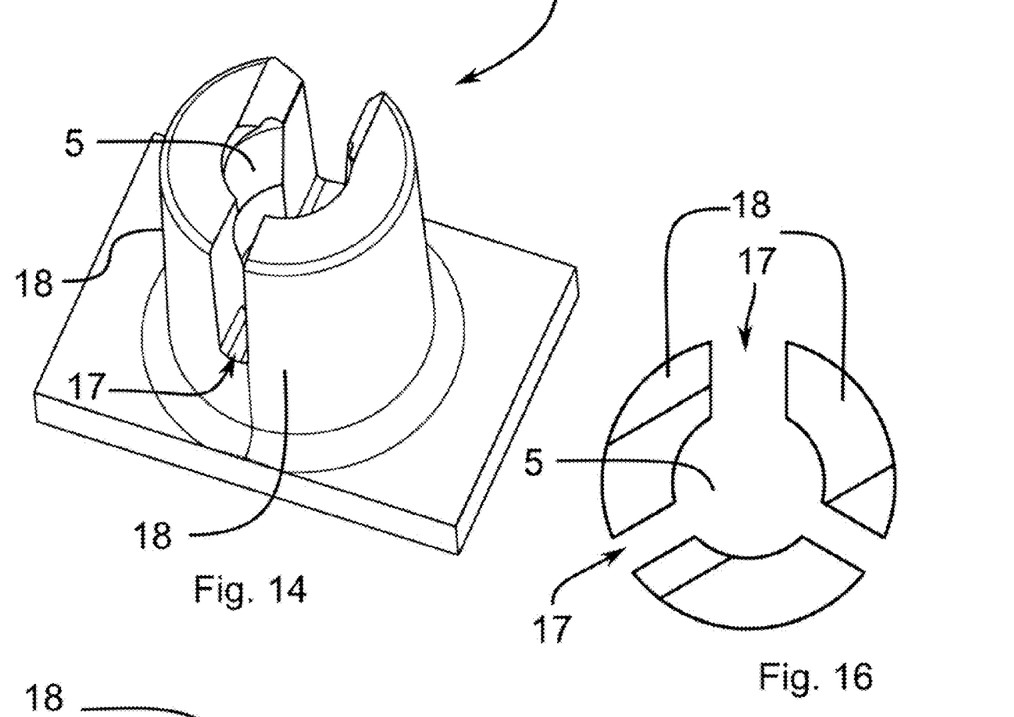
FIG. 14 schematically shows a perspective view of the protruding part from FIGS. 7 and 8.
FIG. 16 schematically shows a cross section of the protruding part from FIG. 15.
Figure 15:
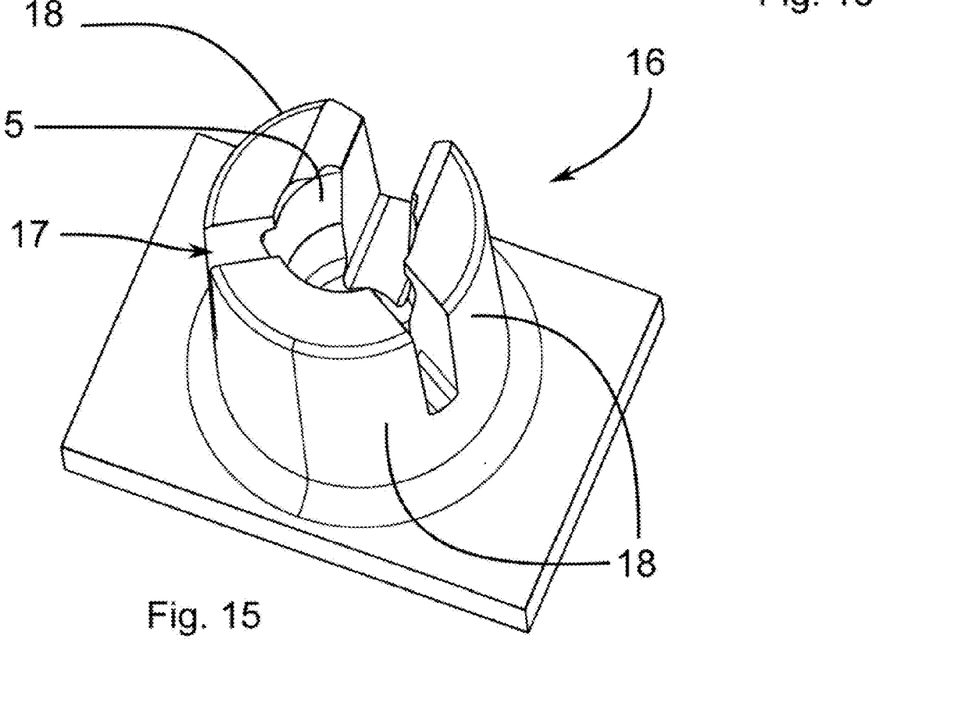
FIG. 15 schematically shows an alternative embodiment of a protruding part which has three sections.

In other embodiments, there can be for example three sections forming the protruding part 16, as is depicted in FIGS. 15 and 16. The slit 17 is then branched, and in the depicted embodiment, it has a wider branch (upper branch in FIG. 15), which can serve as a poka-yoke recess. The size and shape of the cavity, and thus also of the fins 7 which are at least to some extent complementary to the cavity in order to brace against its wall(s), can also be different. For example, the cavity can have an elliptical or rectangular cross sections. The cavity wall(s) can also comprise ribs, flanges or similar shape elements for engaging with the fins 7 and thus further preventing the backwards movement of the mounting protrusion 6.

There can be a groove 11 provided on the strip 2, on the side which is in contact with cables 3 during use. The groove 11 extends through the whole width of the strip 2 and is sized such that at least one cable 3 can at least partially fit into the groove 11. That is, the cross-section of the groove 11 is such that a cable 3 can be guided by the groove 11, as can be seen in FIG. 13. The groove 11 can be a recessed part of the strip 2, however, more preferably, it is formed between two parallel protruding ridges. In the depicted embodiment, there is one groove 11 formed between two ridges and another formed between a ridge and a bent portion of the strip 2. In different embodiments, there can be any number of grooves 11 and ridges provided for guiding one or more cables 3. In some embodiments, a groove 11 can have a cross section such that multiple cables 3 can fit into the groove 11.

The grooves 11 can be placed on a part of the strip 2 sufficiently close to the body 1, e.g., on a first third of the length of the strip 2, or even on a first tenth of the length etc. Depending on the number of cables 3 to be bound and their diameters, the groove 11 closest to the body 1 can e.g., be less than 2 cm from the body 1. The binder can be for example made from a plastic material, e.g., containing a filler, such as glass fibers. The body 1 is preferably made from one piece of material together with the strip 2, e.g., by injection molding. A suitable material can for example be polyamide or nylon 66, preferably with the glass filler. The strip 2 can be provided with an anti-slip structure 13 on its side meant for contact with the cables 3. This structure can for example be a mesh or grooving provided on the strip 2 surface. The structure can increase the roughness of the surface and thus limit slipping of the cables 3 along the strip 2 or through the loop 4. The structure can also be made from a different material, e.g., silicone or rubber.

In the depicted embodiment, the body 1 of the binder further comprises a rib 12 for squeezing the cables 3 bound by the binder, wherein the rib 12 is perpendicular to the cables 3. The rib 12 is thus placed on a part of the binder which is in (or intended for) contact with the cables 3, e.g., on the inner side of the loop 4 when the loop 4 is closed and tightened around the cables 3. In the embodiment shown in FIG. 13, there are two parallel ribs 12 provided and they are placed on the body 1. In other embodiments, the rib(s) 12 can however be at least partially placed on the strip 2, e.g., after the last ridge or groove 11 in the direction towards the free end of the strip 2. In embodiments where the ribs 12 are placed on the same part of the length of the strip 2 as the ridges, the ribs 12 are preferably interrupted at the ridges such that the ridge itself has the same height along its whole length, not locally increased by the rib(s) 12. In some embodiments, more than two ribs 12 can be used.

Figures 1, 2:
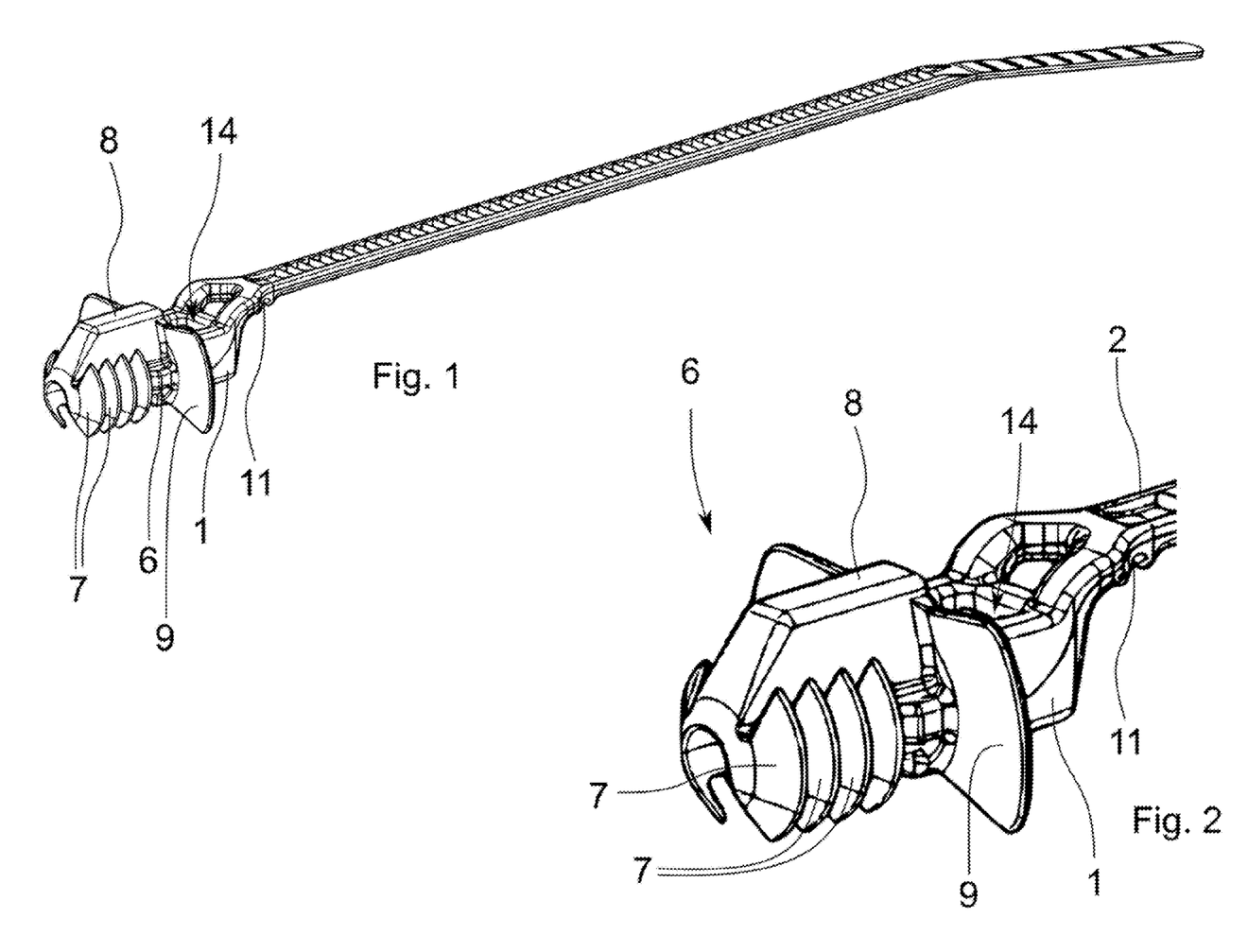
FIG. 1 schematically shows a perspective view of an example of cable binder according to the invention.
FIG. 2 shows a detail of the body of the binder from FIG. 1, wherein a mounting protrusion with four fins and a poka-yoke element in the form of a poka-yoke protrusion can be seen, as well as a stop element on the body and a branched connecting portion.
Figures 3, 4:
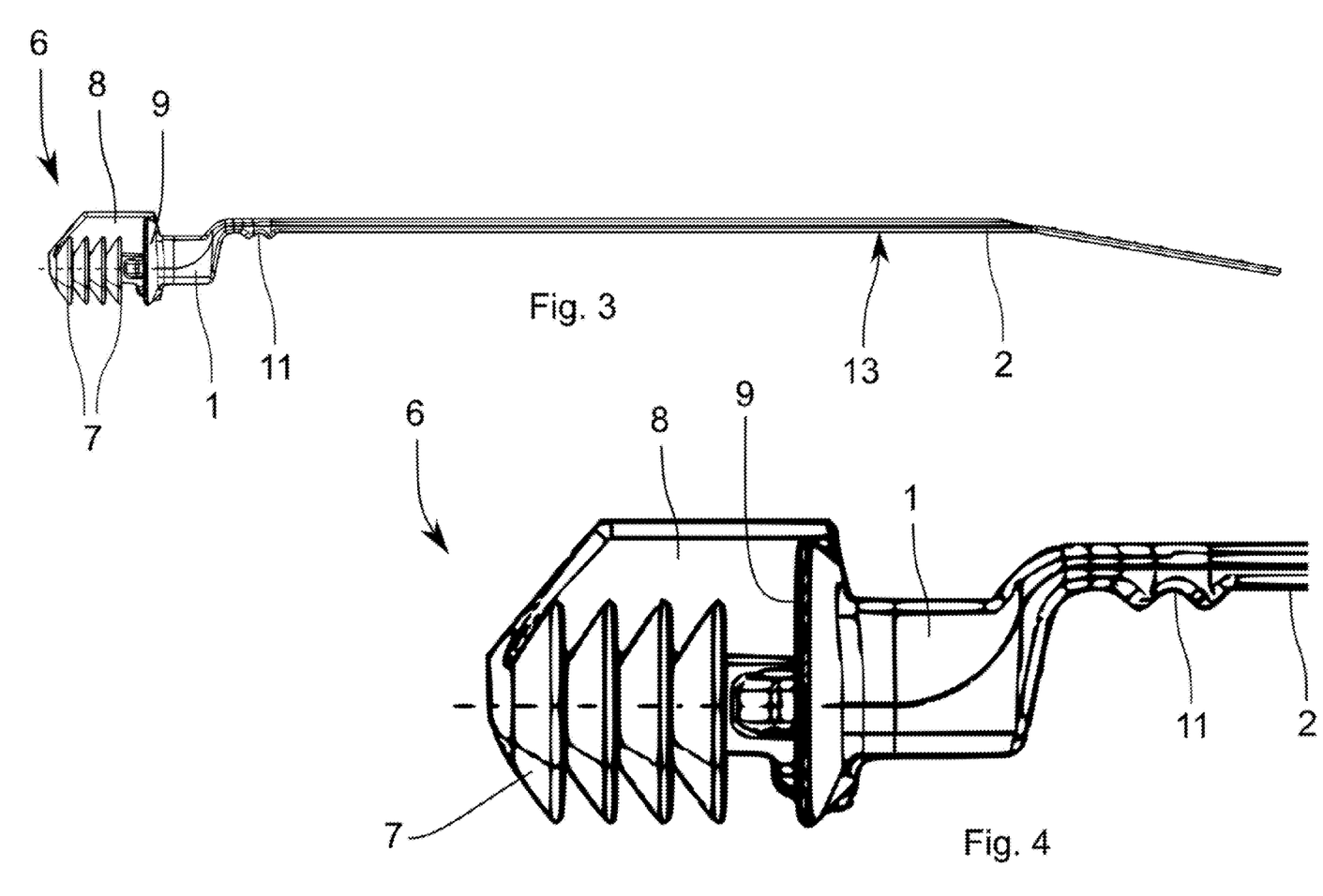
FIG. 3 shows a sideview of the binder from FIG. 1.
FIG. 4 shows a detail of the body from FIG. 3.
Figure 17:
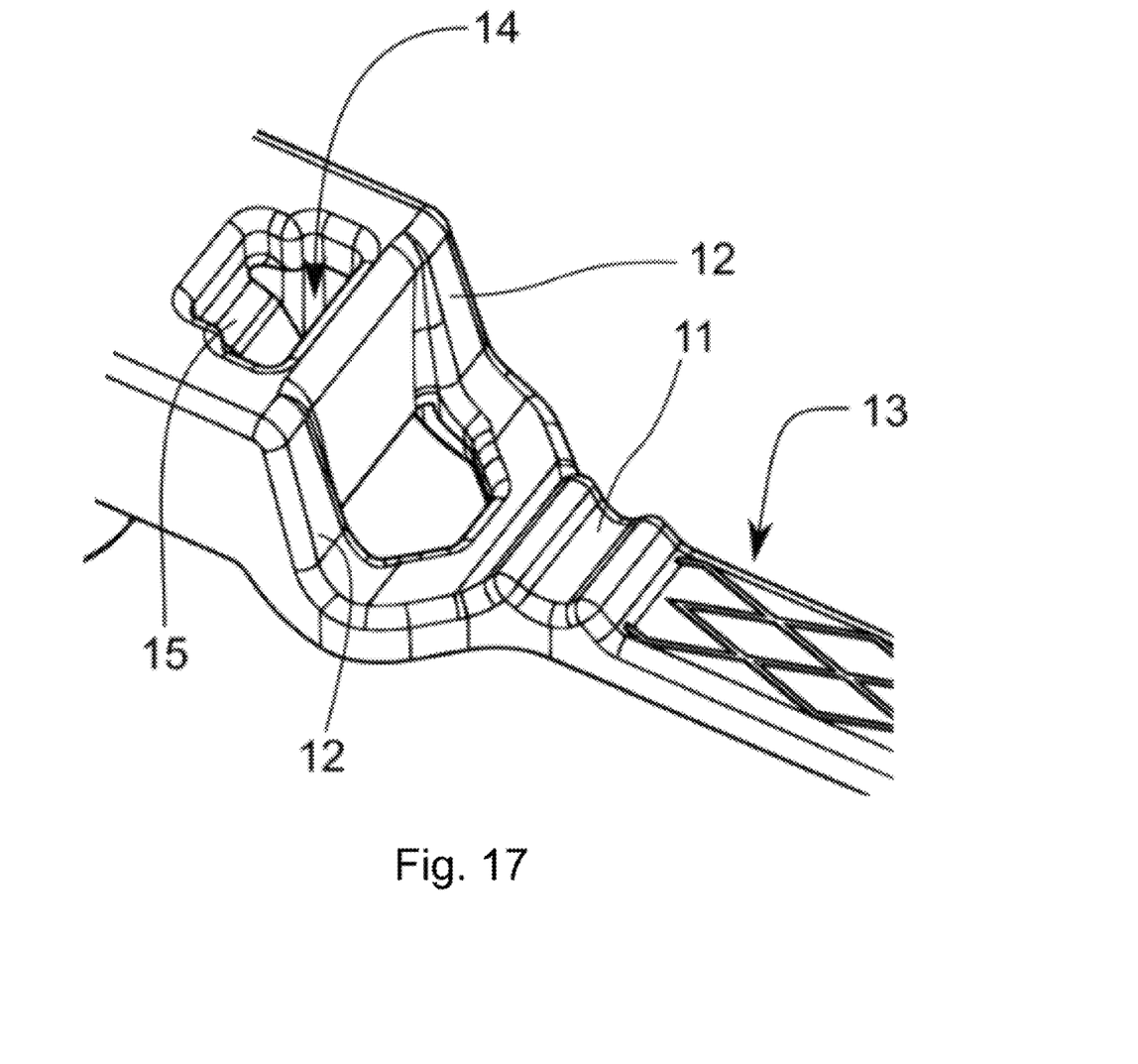
FIG. 17 schematically shows a detailed view of a connecting portion of the body, having two branches, two ribs and a groove for guiding cables.

The rib(s) 12 can have a width which is larger than the width of the grooves 11, such that they squeeze the cables 3 on a larger portion of the cables' 3 length and thus do not damage them. For example, the width of each rib 12 can be at least two or at least three times as large as the diameter of cables 3 which are expected to be bound by the binder. Preferably, there are two ribs 12 on the body 1 and they are as far from each other as possible by the body's 1 width. In embodiments with the branched connecting portion, as described in more detail below and as shown in FIG. 17, the ribs can have substantially the same width as the branches, e.g., the same width±25%. This ensures a sufficient contact area with the cables 3 while the two ribs 12 are still separated by a large enough gap for holding the cables 3. The height of the rib(s) 12 can for example be from 0.1 to 3 mm, depending on the number of cables 3 to be bound, diameter of the cables 3, material of their sheath(s), intended placement of the binder etc. The width of the ribs 12 is measured in direction perpendicular to the plane of FIG. 13, their height is the smaller dimension measurable in FIG. 13, i.e., the one measured on the rib 12 in direction towards the grooves 11 and ridges. Length of the ribs 12 would then be the longer dimension visible in FIG. 13, along the surface from which the ribs protrude. FIG. 2 then shows the branched of the connecting portion, so the arrangement of the two parallel ribs 12 can be inferred from this figure, even though the ribs themselves are not visible there. Each rib 12 can basically be an extended portion of the respective branch, protruding from the body 1 towards the inside of the loop 4.

The strip 2 can be attached to the body 1 via a connecting portion of the body 1 comprising a hole for increasing flexibility of the point of attachment. The connecting portion can thus have two branches which are at one end firmly connected to the body 1 and at the other and are joined together and connected firmly to the strip 2 (see especially FIG. 2). The size of the hole can be such that the strip 2 cannot be inserted therein, in order to prevent insertion of the strip 2 into incorrect place when mounting the binder and binding cables 3 with it. The connecting portion, whether it is branched or not, can also be bent such that the loop 4, when being closed around a bundle of cables 3, is placed next to the body 1, i.e., substantially at the same height as the body 1, when viewed from the side. Such a shape of the connecting portion, when the strip 2 is straight before closing the loop 4, can be seen e.g., in FIG. 2 or 4. This curved/bent shape can help guiding the bound cables 3 closer to the surface of the vehicle to which the body 1 is attached. This can help with saving space in the vehicle, e.g., inside of a lamp, and can help preventing damage to the cables 3. In other words, when the loop 4 is closed around some cables 3 and the binder is viewed in the direction along these cables 3 (e.g., the sideview from FIG. 13), most of the loop 4 is preferably located next to the body 1, i.e., less than half of the volume taken by the loop 4 extends vertically (i.e., up and/or down) beyond the body 1. The volume can be the inner volume of the loop 4, e.g., as can be seen in FIG. 13, where the loop 4 extends above/beyond the body 1 approximately only by the thickness of the strip 2, with the space inside of the loop 4 being substantially the same height as the body 1.

The ribs 12 and/or the grooves 11 or the ridges forming the grooves 11 preferably have blunted edges, at least on places that can come into contact with cables 3. The groove (s) 11 or some of them can be placed on the body 1, i.e., the grooves 11 do not necessarily have to be on the strip 2. In such embodiments, the grooves 11 on the body 1 extend across the width of the body 1, i.e., in the same direction as they would on the strip 2, such that the cables 3 bound by the binder can be guided by the groove(s) 11, preferably in a substantially straight line. Generally, the grooves 11 are placed on the section of the binder which is closable into the loop 4, and at least some of the grooves 11 are inside of the loop 4 and can come into contact with the cables 3. This section of the binder preferably comprises a part of the body 1 as well as at least part of the strip 2 (as is depicted in FIG. 13). In some embodiments, the strip 2 can however form the loop 4 by itself, e.g., when the securing mechanism is entirely placed on the strip 2. Example of such a mechanism can be a hook-and-loop fastener, with the hook portion on one side of the strip 2 and the loop portion on the other side. This section of the binder can also generally comprise the rib(s) 12, which can be placed on a different part of the section, e.g., on the opposite part of the loop 4 such that the cables 3 are forced towards the groove(s) 11 by the rib(s) 12.

In an alternative embodiment, the connecting portion is shaped such that the loop 4 is oriented perpendicularly with respect to the shown embodiment. The cables 3 bound by the loop 4 can then extend in parallel with the mounting protrusion, e.g., above it. The loop 4 forming section in this embodiment can be provided with the groove(s) 11 and/or rib(s) 12, as described above, e.g., placed on the strip 2 or on the connecting portion.

The cable binder, as described above, can be a part of a cable-binding assembly which comprises the binder and also the opening 5, e.g., placed on a vehicle component. The opening 5 can be fixed inside of a vehicle, e.g., to an inner part of a dashboard, of a lamp etc. The vehicle component with the opening 5 can for example be a lamp frame. The frame can comprise the protruding part 16 with the cavity for fixing the binder. In such an embodiment, the component is preferably plastic, as is the binder. As another example, the component can be a metallic sheet, e.g., a part of an aluminium heat sink. The opening 5 can then be a through hole through the sheet.

The assembly can be a part of a vehicle lamp, e.g., an automobile headlight, rear combination lamp, car body lighting, position line light, fog light, etc. For example, the component with the opening 5 can be an integral part of a lamp frame, and the binder can then hold cables 3 for powering various lamp modules.

LIST OF REFERENCE NUMERALS

1 body
2 strip
3 cable
4 loop
5 opening
6 mounting protrusion
7 fin
8 poka-yoke element
9 stop element
10 wall
11 groove
12 rib
13 anti-slip structure
14 through-hole
15 pawl
16 protruding part
17 slit
18 section of protruding part The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A cable binder for vehicles, the cable binder comprising:
   a body for attachment to the vehicle; and
   a strip for binding cables which is fixed to the body,
   wherein the binder further comprises a securing mechanism for closing a part of the binder into a loop around the cables, wherein the body comprises a mounting protrusion for insertion into an opening in a vehicle, wherein the mounting protrusion comprises a poka-yoke element for engaging with a complementary poka-yoke element in the vehicle's opening to prevent an incorrect mounting orientation, wherein the poka-yoke element of the mounting protrusion comprises a poka-yoke protrusion and/or recess, wherein the mounting protrusion further comprises at least one fin for bracing against a wall surrounding the vehicle's opening, wherein each fin extends outward to define at least part of an outer perimeter of the mounting protrusion and flexes rearwardly when the mounting protrusion passes through the opening in the vehicle.

2. The cable binder according to claim 1, wherein the mounting protrusion is mountable into the opening in only one orientation of the body with respect to the opening.

3. The cable binder according to claim 1, wherein the binder is made of a plastic material containing a glass filler.

4. The cable binder according to claim 1, wherein the mounting protrusion comprises at least two fins in total, wherein the fins extend parallel to each other.

5. The cable binder according to claim 1, wherein the mounting protrusion has a fixed end, which is attached to the body, and a free end for insertion into the opening, wherein each fin is tapered in direction towards the free end.

6. The cable binder according to claim 1, wherein when viewed in direction parallel to the length of the mounting protrusion, an outer perimeter of each fin forms at least a part of a circle.

7. A cable binder for vehicles, the cable binder comprising:
   a body for attachment to the vehicle; and
   a strip for binding cables which is fixed to the body,
   wherein the binder further comprises a securing mechanism for closing a part of the binder into a loop around the cables, wherein the body further comprises a mounting protrusion for insertion into an opening in a vehicle, wherein the mounting protrusion comprises a poka-yoke element for engaging with a complementary poka-yoke element in the vehicle's opening, wherein the poka-yoke element of the mounting protrusion comprises a poka-yoke protrusion and/or recess, wherein the mounting protrusion further comprises at least one fin for bracing against a wall surrounding the vehicle's opening, wherein each fin extends around at least part of perimeter of the mounting protrusion, wherein the strip comprises at least one groove for fitting at least part of a perimeter of a cable, wherein the groove extends across the whole width of the strip and is placed on the side of the strip meant for contacting the cables.

8. The cable binder according to claim 1, wherein the body comprises two ribs for squeezing cables, wherein the ribs are inside of the loop when the binder is closed into a loop around the cables and both ribs extend along the inner perimeter of the loop perpendicularly to the direction of cables bound by the loop.

9. The cable binder according to claim 1, wherein the strip comprises an anti-slip structure placed on the side of the strip meant for contacting the cables.

10. A cable-binding assembly for vehicles comprising:
a component for a vehicle, wherein the component comprises an opening; and
a cable binder including:
a body for attachment to the vehicle; and
a strip for binding cables which is fixed to the body, wherein the binder further comprises a securing mechanism for closing a part of the binder into a loop around the cables, wherein the body further comprises a mounting protrusion for insertion into an opening in a vehicle, wherein the mounting protrusion comprises a poka-yoke element for engaging with a complementary poka-yoke element in the vehicle's opening, wherein the poka-yoke element of the mounting protrusion comprises a poka-yoke protrusion and/or recess, wherein the mounting protrusion further comprises at least one fin for bracing against a wall surrounding the vehicle's opening, wherein each fin extends around at least part of perimeter of the mounting protrusion, wherein the opening comprises a poka-yoke element for engaging with the poka-yoke element of the binder when the body of the binder is mounted by the mounting protrusion into the opening.

11. The cable-binding assembly according to claim 10, wherein the opening is a cavity formed in a protruding part of the component, wherein when the mounting protrusion is inside of the opening, at least one fin presses against an inner wall of the cavity.

12. The cable-binding assembly according to claim 10, wherein the opening is a through hole in a wall of the component.

13. The cable-binding assembly according to claim 12, wherein the body of the binder comprises a stop element for delimiting a maximum insertion of the mounting protrusion into the opening, wherein the shortest distance between at least one of the fins and the stop element is smaller than thickness of the wall.

14. The cable-binding assembly according to claim 12, wherein:
the body of the binder comprises a stop element for delimiting a maximum insertion of the mounting protrusion into the opening; and
when the mounting protrusion is inside of the opening, the wall is clamped between at least one of the fins and the stop element.

15. A vehicle lamp comprising the cable-binding assembly according to claim 10.

* * * * *